Patented July 10, 1928.

1,676,697

UNITED STATES PATENT OFFICE.

OSKAR KALTWASSER, OF BERLIN, HANS OEHRN, OF CHARLOTTENBURG, AND HERMANN KIRCHHOFF, OF BERLIN-LICHTERFELDE, GERMANY, ASSIGNORS, BY MESNE ASSIGNMENTS, TO GRASSELLI DYESTUFF CORPORATION, OF NEW YORK, N. Y., A CORPORATION OF DELAWARE.

ORTHO-HYDROXYAZO DYE.

No Drawing. Application filed June 30, 1925, Serial No. 40,681, and in Germany July 28, 1924.

Ortho-hydroxyazo dyes of considerable technical importance are obtained by coupling a naphthalene-1.2-diazo-oxide-4-sulphonic acid, or a derivative thereof with a 1-aryl-3-methyl-5-pyrazolone.

According to this invention dyes of this kind, of enhanced value, are obtained by selecting for the first component a naphthalene-1.2-diazo-oxide-4-sulphonic acid which contains an acidyloxy group in the beta-position of the unsulphonated nucleus of the naphthalene. The presence of this group improves the properties of fastness. The new dyes in the form of their sodium salts have most probably the general formula:

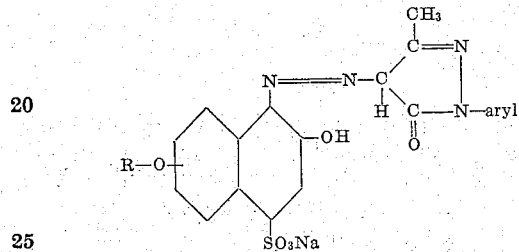

wherein R represents the radical of an organic acid. The dyes are, in their dry pulverized form, dark powders insoluble in ether and in benzene, but soluble in water yielding a yellow to reddish-yellow solution. They dye wool orange to brown tints which become red to bluish-red when chromated.

The diazo-oxides required for the manufacture may be made by treating with nitrite in presence of a metal salt a 1-amino-2.6- or 2.7-dihydroxynaphthalene-4-sulphonic acid, or a derivative thereof, and causing an acid anhydride or an acid halide to act on the diazo-oxide thus formed.

The following examples illustrate the invention without limiting it, the parts being by weight:

1. 9 parts of the 4-toluene-sulphonic acid ester of 7-hydroxynaphthalene-1.2-diazo-oxide-4-sulphonic acid are dissolved in 270 parts of water and the solution is added to a solution of 3.5 parts of 1-phenyl-3-methyl-5-pyrazolone, 1 part of sodium hydroxide and 2 parts of anhydrous sodium carbonate in 140 parts of water, the temperature being 5–10° C. The formation of the dyestuff is complete after a short time. The dyestuff is worked up in the usual manner. It probably has the formula:

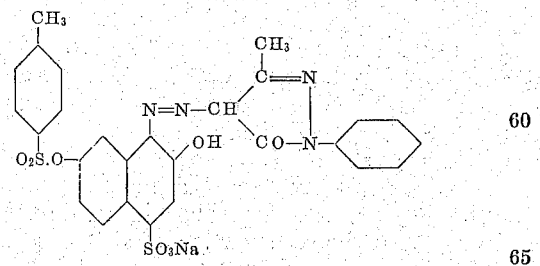

It dyes wool a dull orange which when chromated becomes a dull bluish red. It also dyes in presence of a normal chromate and an ammonium salt which dissociates. The dyeings are faster to washing and fulling than that obtained from the dyestuff derived from naphthalene-1.2-diazo-oxide-4-sulphonic acid and 1-phenyl-3-methyl-5-pyrazolone.

2. 9 parts of 4-toluene-sulphonic acid ester of 7-hydroxynaphthalene-1.2-diazo-oxide-4-sulphonic acid are dissolved in 270 parts of water and the solution is added to a solution of 4.5 parts of 1-p-nitrophenyl-3-methyl-5-pyrazolone, 1 part of sodium hydroxide and 2 parts of anhydrous sodium carbonate in 140 parts of water, the temperature being 5–10° C. The dyestuff, which forms rapidly, is worked up in the usual manner. It probably has the formula:

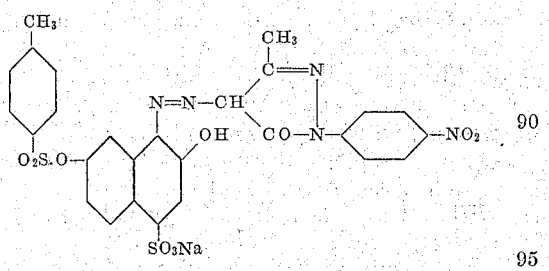

It dyes wool an orange brown which becomes a bluish bordeaux when chromated.

3. 9 parts of the 4-toluenesulphonic acid ester of 7-hydroxynaphthalene-1.2-diazo-oxide-4-sulphonic acid are dissolved in 270 parts of water and the solution is added to a solution of 4.5 parts of 1-α-naphthyl-3-methyl-5-pyrazolone, 1.5 parts of sodium hydroxide and 2 parts of anhydrous sodium carbonate in 210 parts of water, the temperature being 5–10° C. The dyestuff worked up in the usual manner dyes wool orange. It probably has the formula:

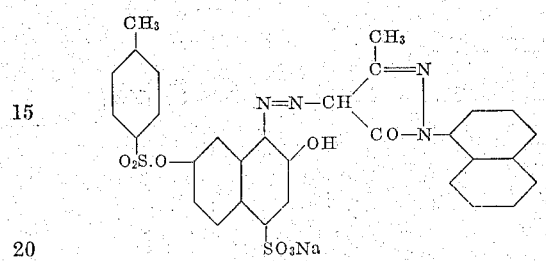

The dyeing becomes a dull red when chromed.

A similar dye is obtained if 1-beta-naphthyl-3-methyl-5-pyrazolone is substituted for the 1-alpha-naphthyl-3-methyl-5-pyrazolone in the foregoing example.

4. 8 parts of the benzoic acid ester of 7-hydroxynaphthalene-1. 2-diazo-oxide-4-sulphonic acid are dissovled in 240 parts of water and the solution is added to a solution of 3.5 parts of 1-phenyl-3-methyl-5-pyrazolone, 1 part of sodium hydroxide and 2 parts of anhydrous sodium carbonate in 140 parts of water, the temperature being 5 to 10° C. The dyestuff, which is formed after a short time, is worked up in the usual manner. It probably has the formula:

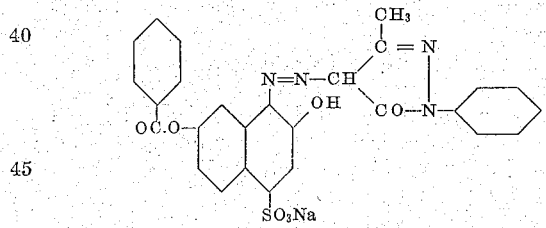

and dyes wool a dull brown, which becomes bluish red when after-chromed.

What we claim is,—

1. The herein-described new ortho-hydroxyazo dyes, which in their dry pulverized form are dark powders soluble in water yielding a yellow to reddish yellow solution but insoluble in ether and in benzene, which dye wool orange to brown tints which become red to bluish red when chromated, which dyes may be obtained by coupling with a 1-aryl-3-methyl-5-pyrazolone a naphthalene-1.2-diazo-oxide-4-sulphonic acid which contains an acidyloxy group in the beta-position of the unsulphonated nucleus of the naphthalene, and which dyes in the form of their sodium salts probably correspond to the formula:

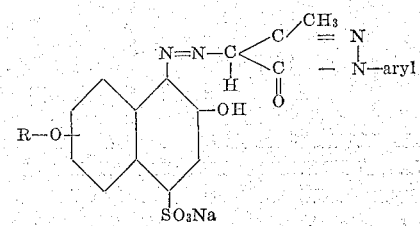

wherein R represents the radical of an organic acid.

2. The herein-described new ortho-hydroxyazo dyes, which in their dry pulverized form are dark powders soluble in water yielding a yellow to reddish yellow solution but insoluble in ether and in benzene, which dye wool orange to brown tints which become red to bluish red when chromated, which dyes may be obtained by coupling with a 1-aryl-3-methyl-5-pyrazolone a naphthalene-1.2-diazo-oxide-4-sulphonic acid which contains an acidyloxy group in the 7-position, and which dyes in the form of their sodium salts probably correspond to the formula:

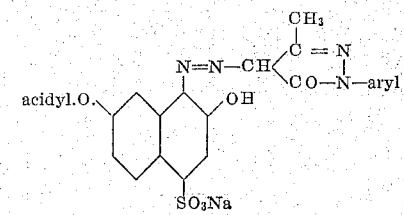

3. The herein-described new ortho-hydroxyazo dyes, which in their dry pulverized form are dark powders soluble in water yielding a yellow to reddish yellow solution but insoluble in ether and in benzene, which dye wool orange to brown tints which become red to bluish red when chromated, which dyes may be obtained by coupling with a 1-aryl-3-methyl-5-pyrazolone the 4-toluene-sulphonic ester of 7-hydroxynaphthalene - 1.2 - diazo-oxide - 4 - sulphonic acid, and which dyes in the form of their sodium salts probably correspond to the formula:

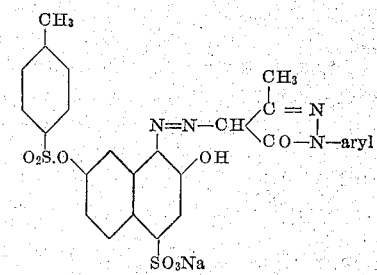

4. The herein-described new ortho-hydroxyazo dyes, which in their dry pulverized form are dark powders soluble in water yielding a yellow to reddish yellow solution but insoluble in ether and in benzene, which dye wool orange to brown tints which become red to bluish red when chromated, which dyes may be obtained by coupling with a 1-phenyl-3-methyl-5-pyrazolone the 4-toluene-sulphonic ester of 7-hydroxynaphthalene-1.2-diazo-oxide-4-sulphonic acid, and which dyes in the form of their sodium salts probably correspond to the formula:

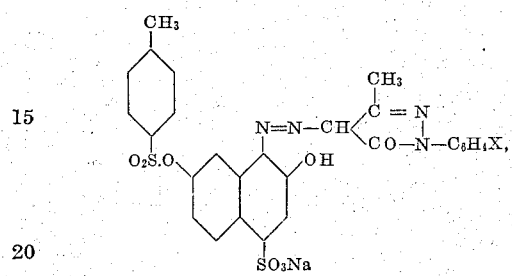

in which X stands for hydrogen or a univalent substituent.

5. The herein-described new ortho-hydroxyazo dyes, which in their dry pulverized form are dark powders soluble in water yielding a yellowish red solution, but insoluble in ether and in benzene, which dye wool an orange tint which becomes a dull bluish red when chromated, which dyes may be obtained by coupling with a 1-phenyl-3-methyl-5-pyrazolone the 4-toluene-sulphonic ester of 7-hydroxynaphthalene-1.2-diazo-oxide-4-sulphonic acid, and which dyes in the form of their sodium salts probably correspond to the formula:

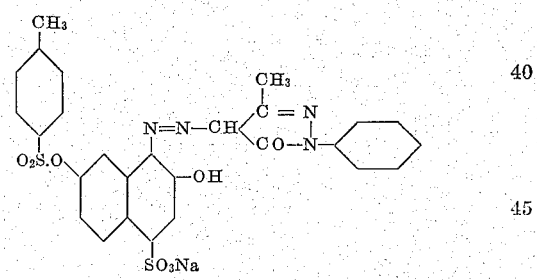

In testimony whereof we affix our signatures.

Dr. Phil. OSKAR KALTWASSER.
HANS OEHRN.
Dipl. Ing. HERMANN KIRCHHOFF.